United States Patent
Bak et al.

(10) Patent No.: US 10,373,650 B2
(45) Date of Patent: Aug. 6, 2019

(54) DATA TRANSFERRING DEVICE AND DATA TRANSFERRING METHOD

(71) Applicant: SAMSUNG ELECTRONICS CO., LTD., Suwon-si, Gyeonggi-do (KR)

(72) Inventors: Bong-gil Bak, Suwon-si (KR); Debasis Sarkar, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 169 days.

(21) Appl. No.: 15/403,407

(22) Filed: Jan. 11, 2017

(65) Prior Publication Data

US 2017/0200478 A1     Jul. 13, 2017

(30) Foreign Application Priority Data

Jan. 11, 2016  (KR) ................... 10-2016-0003301

(51) Int. Cl.
*G11B 31/00* (2006.01)
*G11B 27/00* (2006.01)
(Continued)

(52) U.S. Cl.
CPC ........ *G11B 31/00* (2013.01); *G11B 20/00086* (2013.01); *G11B 20/10* (2013.01);
(Continued)

(58) Field of Classification Search
CPC ...... G06F 13/28; H04N 5/765; H04N 5/7605; H04N 5/9202; H04N 9/7925; G11B 7/28;
(Continued)

(56) References Cited

U.S. PATENT DOCUMENTS 5,513,374 A * 4/1996 Baji .................. G06F 13/32
710/26
5,584,039 A * 12/1996 Johnson ............ G06F 13/126
710/1
(Continued)

FOREIGN PATENT DOCUMENTS

KR   10-2003-0028134   4/2003
KR   10-2004-0081269   9/2004
KR   10-2007-0015970   2/2007

OTHER PUBLICATIONS

Search Report and Written Opinion dated Mar. 23, 2017 in counterpart International Patent Application No. PCT/KR2017/000312.

*Primary Examiner* — David E Harvey
(74) *Attorney, Agent, or Firm* — Nixon & Vanderhye P.C.

(57) ABSTRACT

A data transferring device and a data transfer method. The data transferring device for transferring an audio-visual stream stored in a first medium to a second medium, includes: a reader comprising reading circuitry configured to read the audio-visual stream from the first medium; and a controller configured to: extract an audio packet and a video packet from the audio-visual stream; write the audio packet and video packet to the second medium; and store, in a memory, first location information indicating locations at which the audio packet and the video packet are written in the second medium, and second location information indicating locations at which the audio packet and the video packet are read from the first medium.

20 Claims, 14 Drawing Sheets

(51) Int. Cl.

| | |
|---|---|
| *H04N 5/76* | (2006.01) |
| *H04N 5/907* | (2006.01) |
| *H04N 5/92* | (2006.01) |
| *H04N 9/79* | (2006.01) |
| *G11B 20/10* | (2006.01) |
| *G11B 20/00* | (2006.01) |

(52) U.S. Cl.
CPC ......... *G11B 27/005* (2013.01); *H04N 5/7605* (2013.01); *H04N 5/907* (2013.01); *H04N 5/9202* (2013.01); *H04N 9/7925* (2013.01); *G11B 20/00586* (2013.01); *G11B 2020/10833* (2013.01); *G11B 2020/10842* (2013.01); *G11B 2220/2541* (2013.01); *G11B 2220/2579* (2013.01); *G11B 2220/61* (2013.01)

(58) Field of Classification Search
CPC ....... G11B 31/00; G11B 27/005; G11B 20/10; G11B 20/00086
See application file for complete search history.

(56) References Cited

U.S. PATENT DOCUMENTS

| | | | |
|---|---|---|---|
| 5,748,585 A * | 5/1998 | Tsukamoto | G09B 5/04 369/30.23 |
| 5,793,992 A * | 8/1998 | Steele | G06F 13/1605 710/113 |
| 6,032,191 A | 2/2000 | Chowdhury et al. | |
| 6,154,603 A * | 11/2000 | Willis | G11B 27/005 375/E7.094 |
| RE37,881 E | 10/2002 | Haines | |
| 6,496,826 B1 | 12/2002 | Chowdhury et al. | |
| 6,502,139 B1 | 12/2002 | Birk et al. | |
| 6,564,229 B1 * | 5/2003 | Baweja | G06F 17/30067 707/741 |
| 6,792,006 B1 * | 9/2004 | Kumaki | H04J 3/22 370/363 |
| 6,895,003 B1 * | 5/2005 | Kobayashi | H04L 12/40052 370/389 |
| 7,024,685 B1 * | 4/2006 | Foster | H04N 7/163 348/E7.061 |
| 7,302,697 B1 | 11/2007 | Wilson et al. | |
| 7,409,570 B2 | 8/2008 | Suzuoki | |
| 7,739,421 B1 | 6/2010 | Arulambalam et al. | |
| 7,912,297 B2 | 3/2011 | Jung et al. | |
| 8,032,010 B2 | 10/2011 | Kim et al. | |
| 8,122,477 B1 | 2/2012 | Stepanian | |
| 8,300,632 B2 | 10/2012 | Davis et al. | |
| 8,566,862 B2 | 10/2013 | Dubose | |
| 8,611,729 B2 * | 12/2013 | Katsuo | G11B 27/034 386/284 |
| 8,689,270 B2 | 4/2014 | Wilson et al. | |
| 8,744,050 B2 | 6/2014 | Katis et al. | |
| 8,776,157 B2 | 7/2014 | Alexander et al. | |
| 8,855,189 B1 * | 10/2014 | Krause | H04N 21/234309 375/240 |
| 8,942,549 B2 * | 1/2015 | Duffin | G11B 27/322 386/349 |
| 9,143,341 B2 * | 9/2015 | Harrang | H04L 12/00 |
| 2001/0017973 A1 * | 8/2001 | Abe | G11B 7/28 386/265 |
| 2002/0122656 A1 | 9/2002 | Gates et al. | |
| 2002/0124182 A1 | 9/2002 | Bacso et al. | |
| 2002/0156792 A1 | 10/2002 | Gombocz et al. | |
| 2003/0021298 A1 * | 1/2003 | Murakami | G11B 27/105 370/535 |
| 2003/0221014 A1 * | 11/2003 | Kosiba | H04L 29/06027 709/231 |
| 2004/0008731 A1 * | 1/2004 | Okada | G11B 20/10 370/509 |
| 2004/0117647 A1 | 6/2004 | Ballard | |
| 2004/0168052 A1 | 8/2004 | Clisham et al. | |
| 2004/0258060 A1 * | 12/2004 | Liu | H04N 21/2365 370/389 |
| 2005/0010702 A1 * | 1/2005 | Saito | G06F 13/28 710/52 |
| 2005/0201727 A1 | 9/2005 | Park et al. | |
| 2006/0098952 A1 * | 5/2006 | Fujimoto | H04N 5/23241 386/224 |
| 2006/0106971 A1 * | 5/2006 | Mahar | G06F 3/0605 711/100 |
| 2006/0159425 A1 | 7/2006 | Choi | |
| 2006/0224786 A1 * | 10/2006 | Mukaide | H04N 5/775 710/48 |
| 2006/0245726 A1 * | 11/2006 | Mizuno | H04N 7/163 386/295 |
| 2006/0288372 A1 * | 12/2006 | Harada | G06F 3/0482 725/53 |
| 2007/0011364 A1 * | 1/2007 | Wezelenburg | G06F 13/28 710/22 |
| 2007/0044132 A1 * | 2/2007 | Kubo | H04N 7/1675 725/116 |
| 2007/0130370 A1 | 6/2007 | Akaezuwa | |
| 2007/0162611 A1 * | 7/2007 | Yu | G06Q 30/0242 709/232 |
| 2007/0185909 A1 | 8/2007 | Klein et al. | |
| 2008/0021959 A1 * | 1/2008 | Naghi | G06F 21/10 709/204 |
| 2008/0040517 A1 * | 2/2008 | Takenouchi | G06F 13/28 710/22 |
| 2008/0279532 A1 * | 11/2008 | Shimazaki | G11B 20/00086 386/265 |
| 2008/0313682 A1 | 12/2008 | Kajiura | |
| 2009/0013123 A1 | 1/2009 | Hsieh | |
| 2010/0005239 A1 * | 1/2010 | Hur | G11B 20/1816 711/112 |
| 2010/0226223 A1 * | 9/2010 | Kondo | G11B 20/10527 369/47.15 |
| 2010/0293190 A1 | 11/2010 | Kaiser et al. | |
| 2011/0029644 A1 * | 2/2011 | Gelvin | G06F 15/173 709/220 |
| 2011/0252211 A1 * | 10/2011 | Moudgill | G06F 13/28 711/165 |
| 2012/0207449 A1 * | 8/2012 | Angquist | G11B 27/031 386/278 |
| 2013/0155179 A1 * | 6/2013 | Corley | H04N 7/155 348/14.08 |
| 2013/0259441 A1 * | 10/2013 | Horita | H04N 9/79 386/224 |
| 2014/0143816 A1 | 5/2014 | Compton | |
| 2014/0186010 A1 | 7/2014 | Guckenberger et al. | |
| 2014/0230000 A1 | 8/2014 | Kotecha et al. | |
| 2014/0289785 A1 | 9/2014 | Alexander et al. | |
| 2014/0327626 A1 | 11/2014 | Harrison et al. | |
| 2014/0348483 A1 | 11/2014 | Wilson et al. | |
| 2015/0281747 A1 | 10/2015 | Gonder et al. | |
| 2017/0177243 A1 * | 6/2017 | Trika | G06F 1/26 |

\* cited by examiner

DATA TRANSFERRING DEVICE AND DATA TRANSFERRING METHOD

CROSS-REFERENCE TO RELATED APPLICATION

This application is based on and claims priority under 35 U.S.C. § 119 to Korean Patent Application No. 10-2016-0003301, filed on Jan. 11, 2016, in the Korean Intellectual Property Office, the disclosure of which is incorporated by reference herein in its entirety.

BACKGROUND

1. Field

The present disclosure relates generally to devices and methods for transferring data from a medium to another medium.

2. Description of Related Art

A data bridge technique relates to extracting digital images and sounds stored in a package medium such as a digital versatile disc (DVD) or Blu-ray disc and moving them into a nonvolatile memory such as a hard disc drive (HDD) or a flash memory. Such data transfer is performed in multiple processes in which video and audio streams obtained by unlocking digital rights management (DRM) of original data stored in a disk medium are extracted and modified into a file format designated by the non-volatile memory.

In general, it takes at least several minutes to perform a data bridge operation for each disc. The data bridge operation involves an operation of reading the entire data stored on a disc, and thus the time needed is an inevitable constraint. A user must postpone watching videos stored on the disc during a data bridge operation. As a data bridge operation takes at least several tens of minutes from the start to the end, a user must wait several tens of minutes to watch a movie while the data bridge operation is being performed.

SUMMARY

A data transferring device and a data transferring method are provided, in which the above-described problems are addressed.

Additional aspects will be set forth in part in the description which follows and, in part, will be apparent from the description.

According to an example aspect of an example embodiment, a device configured to transfer an audio-visual stream stored in a first medium to a second medium, includes: a reader comprising reading circuitry configured to read the audio-visual stream from the first medium; and a controller configured to: extract an audio packet and a video packet from the audio-visual write the audio packet and video packet to the second medium; and store, in a memory, first location information indicating locations at which the audio packet and the video packet are written in the second medium, and second location information indicating locations at which the audio packet and the video packet are read from the first medium.

The controller may include: a demultiplexer configured to: extract the audio packet and the video packet from the audio-visual stream; add information on a location at which the audio packet is read from the first medium, to the audio packet; and add information on a location at which the video packet is read from the first medium, to the video packet, and a packet processor configured to: receive the audio packet and the location information added to the audio packet, and the video packet and the location information added to the video packet; and write the audio packet and video packet to the second medium; and store, in the memory, the first location information and the second location.

The first location information may include a location of a video packet that is last written to a video track of the second medium and a location of an audio packet that is last written to an audio track of the second medium.

The second location information may include: an index of a source file in the first medium including a video packet that is last written to the second medium and a location of the video packet in the source file; and an index of a source file in the first medium including an audio packet that is last written to the second medium and a location of the audio packet in the source file.

The packet processor may further store a list of source files stored in the first medium, an index of a source file last read from among the source files, and a last read location in the last read source file.

The controller may be configured to receive a command to pause transferring of data from the first medium to the second medium, and store in a nonvolatile memory, in response to the pause command, the first location information, and the second location information.

The controller may be configured to receive a command to resume transferring of data from the first medium to the second medium, and in response to the received resume command, resume data transfer based on the first location information and the second location information, stored in the nonvolatile memory.

The controller may determine an index of the source file of the first medium from which the audio-visual stream is to be read and a read location in the source file, based on the second location information.

The device may further include a decoder configured to decode the audio-visual stream read from the first medium, based on a format of the first medium.

The device may further include an encoder configured to encode the acquired video packet and audio packet based on a format of the second medium.

The first medium may include a Blu-ray disc, and the second medium may include a nonvolatile memory.

According to an example aspect of another example embodiment, a method of transferring an audio-visual stream stored in a first medium to a second medium, includes: reading the audio-visual stream from the first medium; extracting an audio packet and a video packet from the audio-visual stream, writing the audio packet and video packet to the second medium; and storing first location information indicating locations at which the audio packet and the video packet are written in the second medium and second location information indicating locations at which the audio packet and the video packet are read from the first medium.

BRIEF DESCRIPTION OF THE DRAWINGS

These and/or other aspects, features and attendant advantages of the present disclosure will become apparent and more readily appreciated from the following detailed description, taken in conjunction with the accompanying drawings, in which like reference numerals refer to like elements, and wherein.

DETAILED DESCRIPTION

Figure 1:
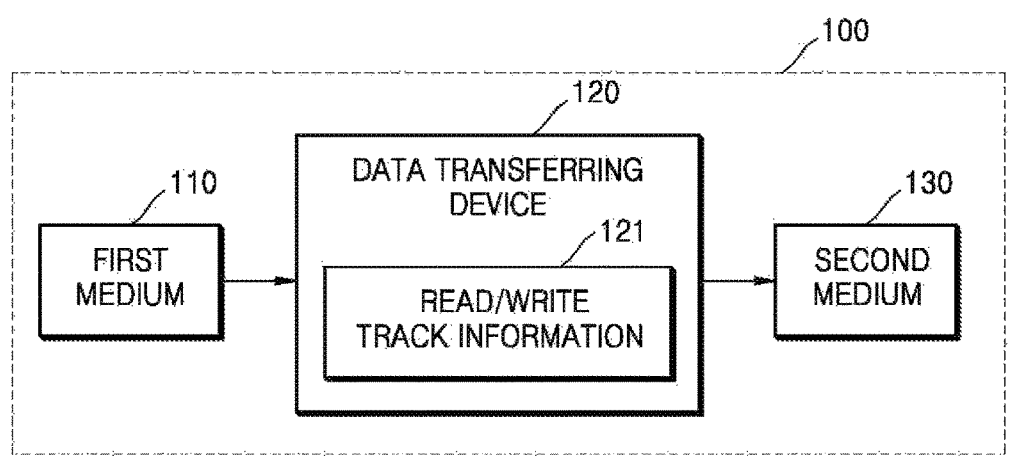
FIG. 1 is a block diagram illustrating an example data transferring system according to an example embodiment.

Reference will now be made in greater detail to various example embodiments, examples of which are illustrated in the accompanying drawings, wherein like reference numerals refer to like components of elements performing substantially the same function throughout the specification. In addition, a method of configuring and using an electronic device according to example embodiments will be fully described with reference to the attached drawings. In this regard, the present embodiments may have different forms and should not be construed as being limited to the descriptions set forth herein. Accordingly, the embodiments are merely described below, by referring to the figures, to explain various example aspects. Expressions such as "at least one of," when preceding a list of elements, modify the entire list of elements and do not modify the individual elements of the list.

In the present description, terms including ordinal numbers such as 'first', 'second', etc. are used to describe various elements but the elements should not be defined by these terms. The terms are used only for distinguishing one element from another element. For example, a first component discussed below could be termed a second component, and similarly, a second component may be termed a first component, without departing from the teachings of this disclosure. As used herein, the term 'and/or' includes any and all combinations of one or more of the associated listed items.

The terms used in the present disclosure are merely used to describe various embodiments, and are not intended to limit the disclosure. An expression used in the singular encompasses the expression of the plural, unless it has a clearly different meaning in the context. In the present specification, it is to be understood that the terms such as 'including' or 'having,' etc., are intended to indicate the existence of the features, numbers, steps, actions, components, parts, or combinations thereof disclosed in the description, and are not intended to preclude the possibility that one or more other features, numbers, steps, actions, components, parts, or combinations thereof may exist or may be added.

FIG. 1 is a block diagram illustrating an example data transferring system 100 according to an example embodiment.

Referring to FIG. 1, the data transferring system 100 may include a first medium 110, a data transferring device (e.g., including data transferring circuitry) 120, and a third medium 130.

The first medium 110 stores audio-visual data, and the audio-visual data stored in the first medium 110 may be encoded or coded in a format of the first medium 110. Data coding may include Digital Rights Management (DRM) in which a predetermined key is used to encode data. For example, the first medium 110 may include a Blu-ray disc or a digital versatile disc (DVD).

The second medium 130 is a medium to which the audio-visual data stored in the first medium 110 may be transferred, and in order to store the audio-visual data in the second medium 130, the audio-visual data may be coded or encoded in a format of the second medium 130. For example, the second medium 130 may be a hard disc drive (HDD), a flash memory, or an external HDD.

The data transferring device 120 may include various circuitry that reads the audio-visual data from the first medium 110 to decode the audio-visual data, and stores the decoded audio-visual data in the second medium 130 according to the format of the second medium 130.

According to an example embodiment, the data transferring device 120 may store read/write track information 121 to be used to track data units written to the second medium 130 when writing the audio-visual data read from the first medium 110, to the second medium 130 in units of preset data.

The read/write track information 121 may include information indicating a location in the second medium 130 of data units written to the second medium 130 and information indicating a location in the first medium 110 of the data units to be written to the data transferring device 120.

According to an example embodiment, in response to a received command to pause data transfer, the data transferring device 120 may store the read/write track information 121 in a nonvolatile memory.

According to an example embodiment, in response to a received command to resume data transfer, the data transferring device 120 may resume data transfer from a point in time when the data transfer was paused, based on the read/write track information 121 stored in the nonvolatile memory.

According to an example embodiment, the data transferring device 120 may store the read/write track information 121 in the nonvolatile memory in the case when a data transferring operation is not allowed to finish due to a system error or the like.

When a data transferring operation may be resumed after recovery of the system error or the like, the data transferring device 120 according to an example embodiment may resume data transfer from a point in time when the data transfer was paused, based on the read/write track information 121 stored in the nonvolatile memory.

In the data transferring system 100 illustrated in FIG. 1, the first medium 110 and the second medium 130 may be any media in different formats. Hereinafter, description will focus on an embodiment in which the first medium 110 is a Blu-ray disc. However, the present disclosure may also be applied to other media than Blu-ray discs.

In addition, while data stored in the data transferring system 100 illustrated in FIG. 1 and the first medium 110, which will be described later, is described mainly as audio-visual data, the data according to the present disclosure is not limited to data including a combination of audio and visual data, but may also be applied when just audio data or just video data exists. In addition, the data according to the present disclosure may be not only audio-visual data but other auxiliary data such as subtitles or interactive data.

Figure 2:
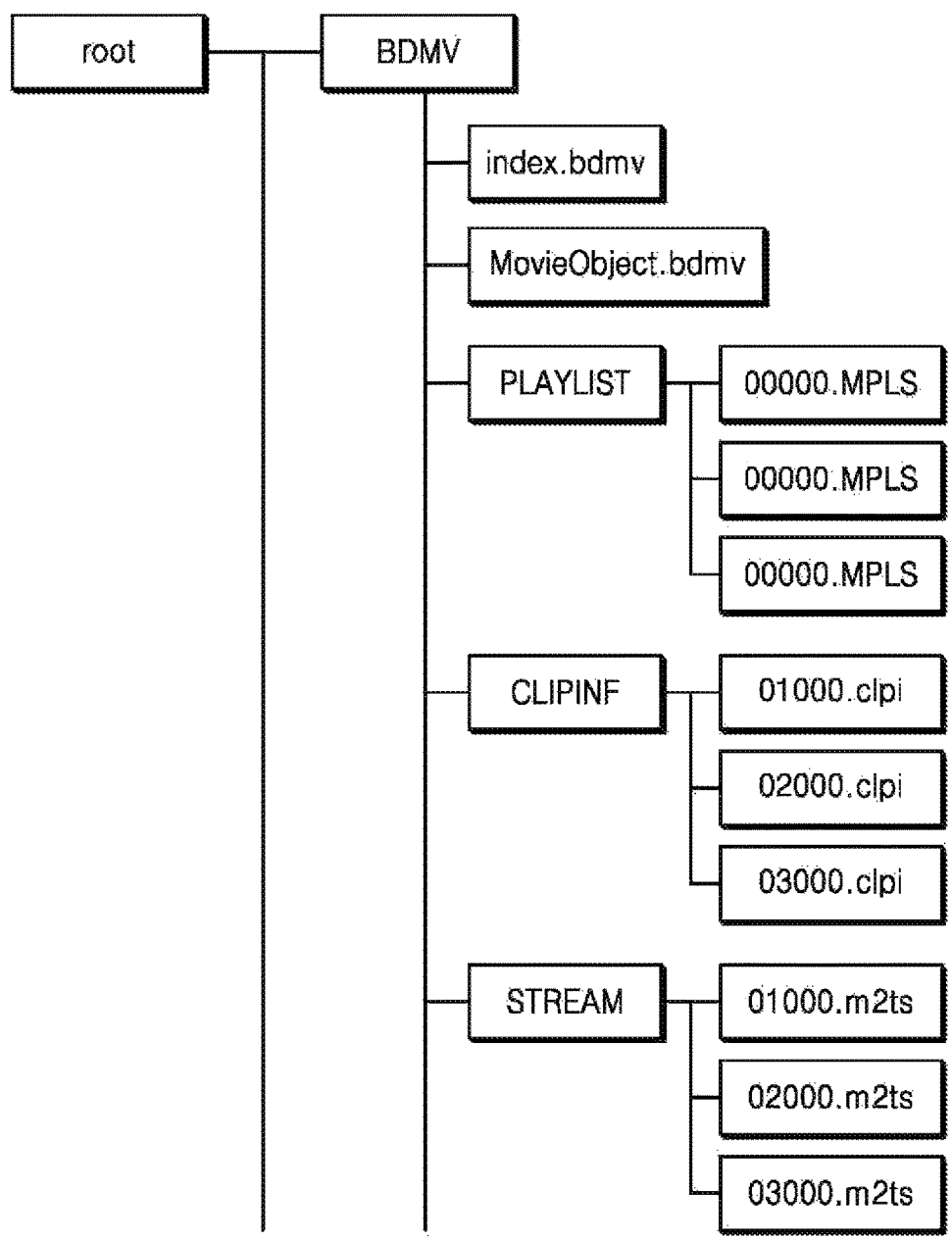
FIG. 2 is a diagram illustrating an example directory including files and directories stored on a Blu-ray disc.

FIG. 2 is a diagram illustrating an example structure of a conceptual directory including files and directories stored in a Blu-ray disc.

A Blu-ray Disc Movie (BDMV) directory is a directory for storing files and directories, and contains an Index.bdmv file and a MovieObject.bdmv file.

The Index.bdmv file stores information describing the contents of the BDMV directory.

The MovieObject.bdmv file stores information for at least one movie object.

A PLAYLIST directory contains playlist files. An xxxx.mpls file stores information corresponding to playlist files.

A CLIPINF directory contains clip information files regarding each clip AV stream files. In detail, a zzzz.clpi file is a clip information file related to the clip AV stream files.

A STREAM directory contains clip AV stream files regarding each clip information file. In detail, a zzzz.m2ts file is a clip AV stream file containing a Blu-ray disc audio-visual (BDAV) MPEG-2 transport stream. A source file to be transferred according to an example embodiment of the present inventive concept is a zzzz.m2ts file, and audio-visual data is stored in the zzzz.m2ts file.

Figure 3:
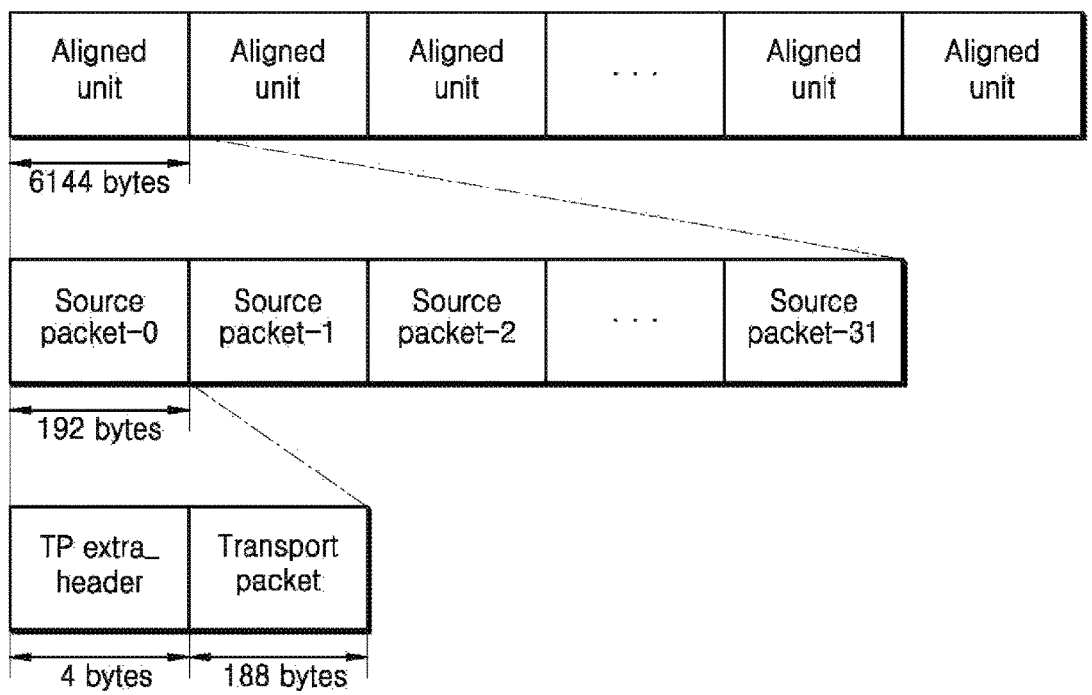
FIG. 3 is a diagram illustrating an example structure of a Blu-ray disc audio-visual (BDAV) MPEG-2 transport stream.

FIG. 3 is a diagram illustrating an example structure of a BDAV MPEG-2 transport stream.

Referring to FIG. 3, an AV stream file stored in a Blu-ray disc has a structure of a BDAV MPEG-2 transport stream.

The BDAV MPEG-2 transport stream includes a plurality of aligned units. Each aligned unit is 6144 bytes.

An aligned unit includes 32 source packets. A size of a source packet is 192 bytes, and each source packet includes a 4-byte header and a 188-byte transport packet. For example, a data unit written to the second medium 130 in FIG. 1 may be a transport packet unit of 188 bytes.

Figure 4:
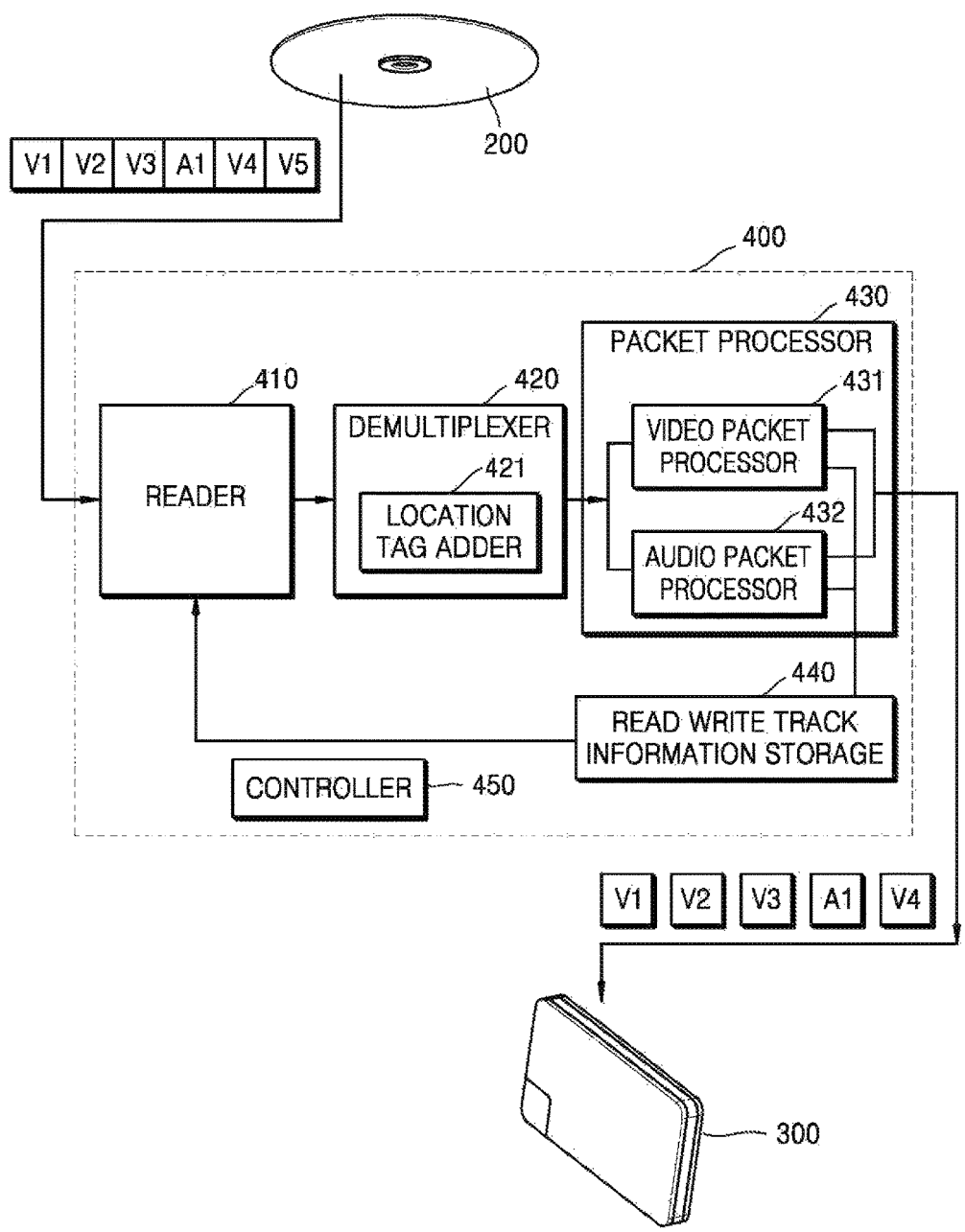
FIG. 4 is a block diagram illustrating an example data transferring device according to an example embodiment.

FIG. 4 is a block diagram illustrating an example data transferring device 400 according to an example embodiment.

Referring to FIG. 4, the data transferring device 400 may include a reader (e.g., including reading circuitry) 410, a demultiplexer 420, a packet processor (e.g., including processing circuitry) 430, a read/write track information storage 440, and a controller (e.g., including processing circuitry) 450. The controller 450 may include the demultiplexer 420 and the packet processor 430.

The reader 410 may include various reader circuitry that is configured to read an audio-visual stream from a first medium 200.

Figure 5:
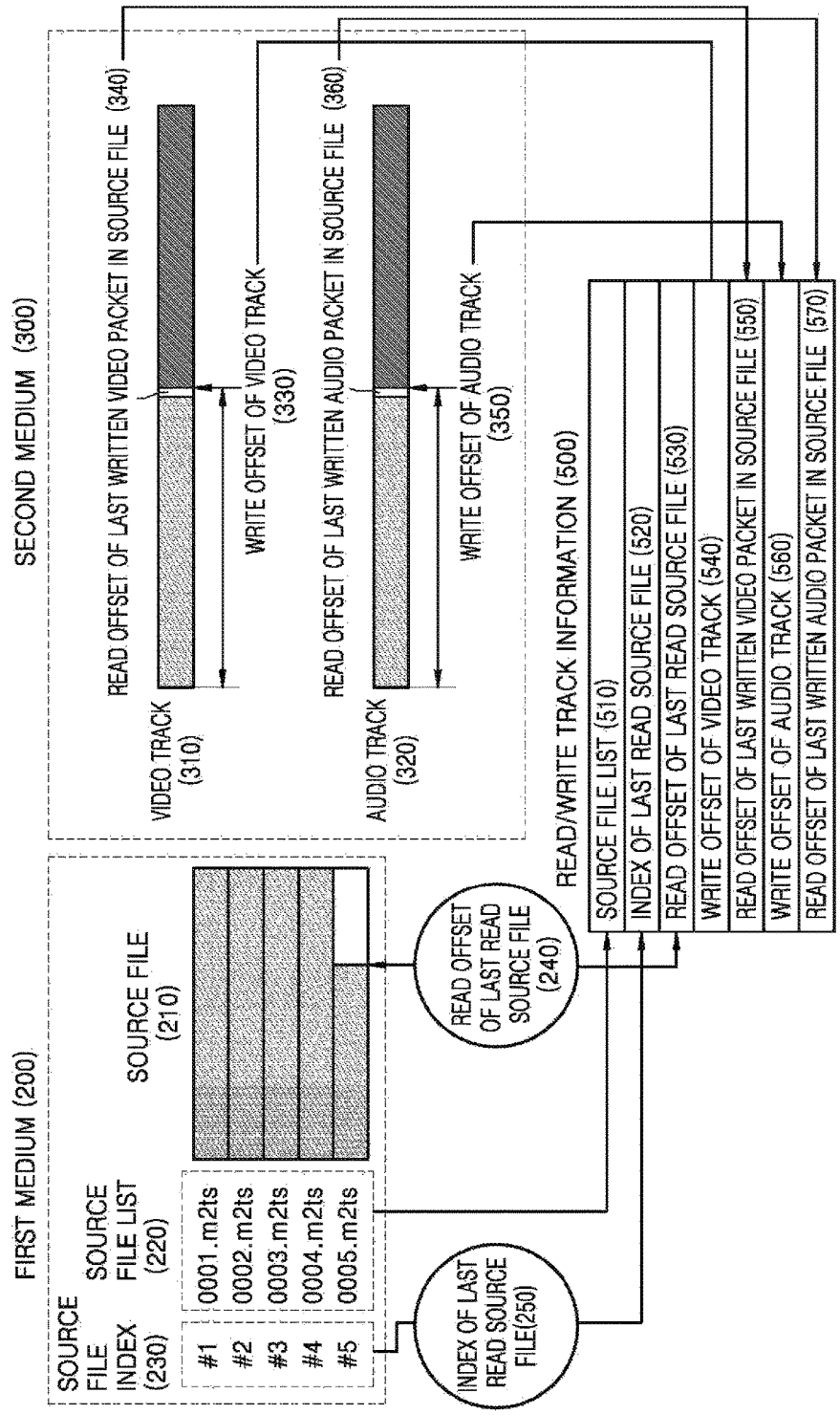
FIG. 5 is a diagram illustrating an example data structure stored in a first medium.

FIG. 5 is a diagram illustrating an example data structure stored in the first medium 200. The first medium 200 may store a plurality of source files.

Referring to FIG. 5, for example, the first medium 200 may store five source files 210. A source file list 220 may include 0001.m2ts, 0002.m2ts. 0003.m2ts, 0004.m2ts, 0005.m2ts, and indices 230 of the source files may be respectively #1 through #5.

The reader 410 may read predetermined units of audio-visual streams included in the source files from the first medium 200 illustrated in FIG. 5. Audio and video streams may be multiplexed in the audio-visual streams included in the source files.

The demultiplexer 420 may receive an audio-visual stream from the reader 410, and extract an audio stream and a video stream from the audio-visual stream. The demultiplexer 420 may add a location tag to each predetermined unit of each audio stream and each video stream using a location tag adder 421. The location tag adder 421 may include various location tag adding circuitry including hardware, software (e.g., a program or program module), or a combination thereof. For example, when predetermined units of an audio stream and a video stream are defined as a packet, the demultiplexer 420 may add a location tag to each audio packet and each video packet. The location tag of the audio packet may indicate location information of the audio packet in a source file of the first medium. A location tag of the video packet may indicate location information of the video packet in a source file of the first medium. For example, location information of the audio packet in a source file of the first medium may include an index of the source file where the audio packet is located and a location of the audio packet in the source file. For example, location information of a video packet in a source file of the first medium may include an index of the source file where the video packet is located and a location of the video packet in the source file.

The packet processor 430 may include various processing circuitry that receives the video packet and the audio packet to which the location tags are added, from the demultiplexer 420. The packet processor 430 may include a audio packet processor 431 and an video packet processor 432.

The audio packet processor 431 receives the video packet including the location tag, and takes off the location tag added to the video packet, and writes the video packet to a second medium 300. Referring to FIG. 5, the second medium 300 includes a video track 310 for writing a video packet and an audio track 320 for writing an audio packet. Accordingly, the audio packet processor 431 sequentially writes video packets to the video track 310. The audio packet processor 431 may store in the read/write track information storage 440 content included in the location tag taken from the video packet, that is, the index of the source file where the video packet is located and a location 550 of the video packet in the source file.

The video packet processor 432 receives the audio packet including the location tag, and takes off the location tag added to the audio packet, and writes the audio packet to the audio track 320 in the second medium 300. The video packet processor 432 may store in the read/write track information storage 440 content included in the location tag taken from the audio packet, that is, the index of the source file where the audio packet is located and a location 570 of the audio packet in the source file.

The packet processor 430 stores, as read/write track information 500, a source file list 510, an index 520 of a last read source file, a read offset 530 of the last read source file, a write offset 540 of a video track, a write offset 560 of an audio track, in the read/write track information storage 440.

The source file list 510 indicates the source file list 220 of source files stored in the first medium 200.

The index 520 of the last read source file indicates an index 250 of a source file that is read last from among the source files of the first medium 200.

The offset 530 of the last read source file indicates a location 240 of a last read packet in the source file. The offset 530 of the last read source file may also indicate a location preceding the location of the last read packet in the source file.

The write offset 540 of the video track indicates a location 330 where the last packet is written in the video track 310 included in the second medium 200.

The write offset 560 of the audio track indicates a location 350 where the last audio packet is written in the audio track 320 included in the second medium 200.

The controller includes at least one processor and controls each element of the data transferring device 400.

The controller 450 may perform an operation in response to a PAUSE command or a RESUME command received via a user interface.

Upon receiving a data transferring PAUSE command, the controller 450 may transfer read/write track information stored in the read/write track information storage 440 to a nonvolatile memory to store the same.

Upon receiving a data transferring RESUME command, the controller 450 may read the read/write track information stored in the nonvolatile memory and determine a location in the first medium 200 where data transfer is to be resumed.

When the location in the first medium 200 to resume data transferring is determined, the controller 450 may control the reader 410 to read audio-visual data from the determined location.

Hereinafter, an operation of storing read/write track information according to an example embodiment will be described in more detail with reference to FIGS. 6 through 8.

Figure 6:
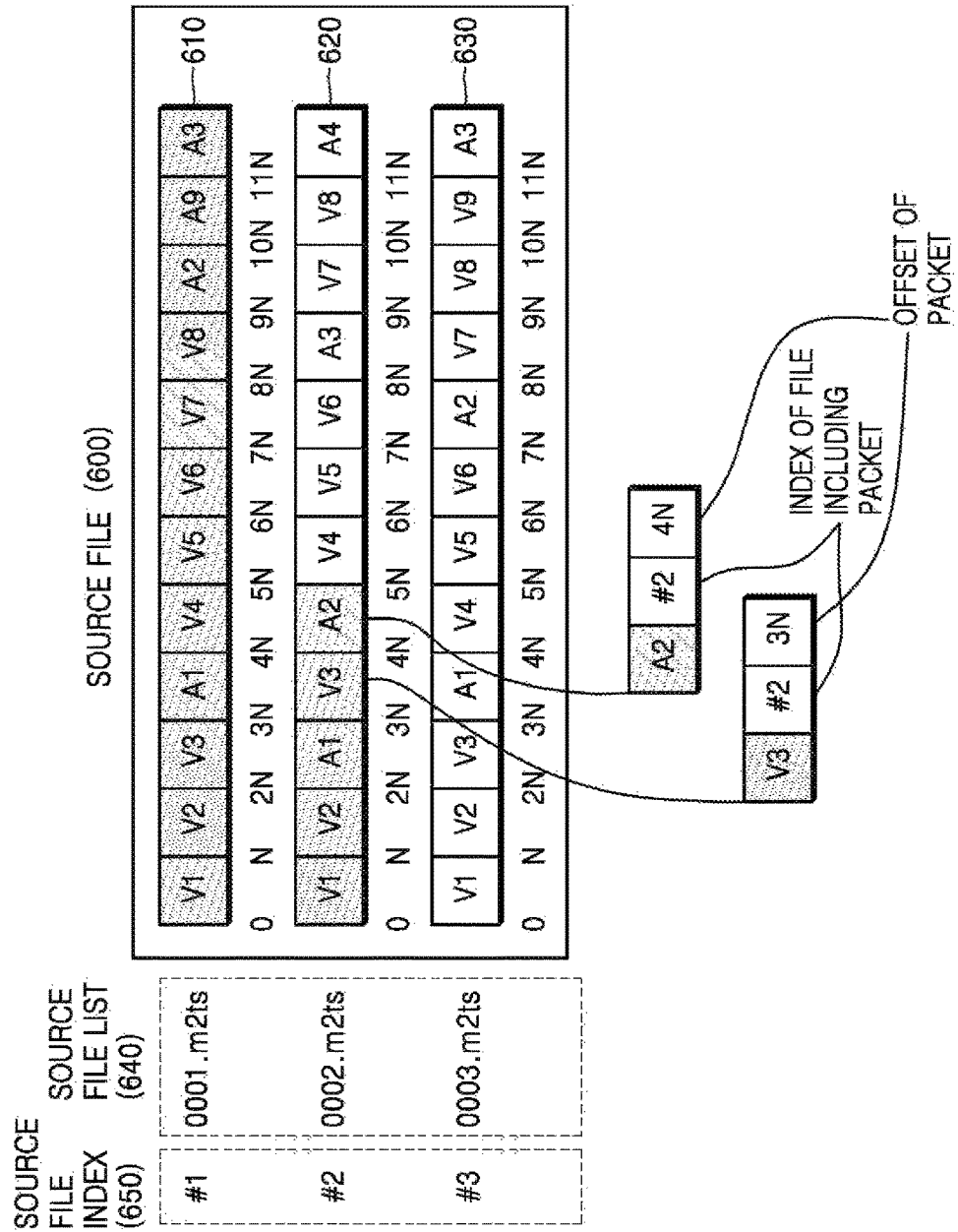
FIG. 6 is a diagram illustrating an example of source files stored in the first medium.

FIG. 6 is a diagram illustrating an example of source files stored in the first medium 200.

Referring to FIG. 6, the first medium 200 stores three source files, 0001.m2ts 610, 0002.m2ts 620, and 0003.m2ts 630. A source file list 640 contains 0001.m2ts, 0002.m2ts, 0003.m2ts, and indices 650 of the source files 610, 620, and 630 are #1, #2, and #3, respectively.

In each source file 600, an audio packet and a video packet are interleaved. V1 through V9 denote video packets, and A1 through A9 denote audio packets. The audio packets or the video packets may respectively have the same size N. Accordingly, an offset of each packet, that is, a location thereof, increases in units of N. A location of an audio packet or a video packet in each source file may be identified by an index of the source file where each packet is located and a location of the packet in the source file. For example, a video packet V3 included in the source file 0002.m2ts 620 may be identified by an index of the source file where the video packet V3 is located and a location of the packet in the source file, that is, (#2,3N). As another example, an audio packet A3 included in the source file 0003.m2ts 630 may be identified by (#3,11N).

Figure 7:
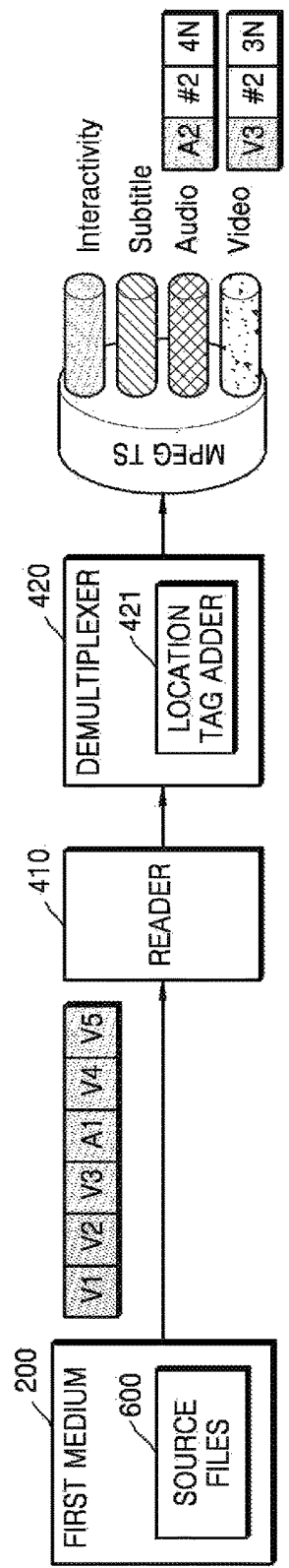
FIG. 7 is a block diagram illustrating an example of output data output from a demultiplexer illustrated in FIG. 4, according to an example embodiment.

FIG. 7 is a block diagram illustrating an example of output data output from the demultiplexer 420 illustrated in FIG. 4, according to an example embodiment.

Referring to FIG. 7, the reader 410 reads an audio-visual stream of the source file 600 illustrated in FIG. 6 from the first medium 200.

The demultiplexer 420 may extract, from the received audio-visual stream, an audio packet, a video packet, an interactive data packet, and a subtitle packet. A location tag adder 421 may add a location tag to each of the extracted audio packet and the extracted video packet.

A location tag is information used to identify a location of each packet in a source file, and may include an index of the source file including the packet and location information of the packet in the source file. Referring to FIG. 6, for example, a location tag of the video packet V3 included in the source file 620, 0002.m2ts, may be (#2,3N), and a location tag of the audio packet A2 included in the source file 620, 0002.m2ts, may be (#2,4N).

The demultiplexer 420 may output packets by adding a location tag to each video packet and each audio packet as described above. Interactive data and subtitle data stored in the first medium 200 may not be used in the second medium 300 but discarded. The demultiplexer 420 may output the video packet and the audio packet including location tags to the packet processer 430.

Figure 8:
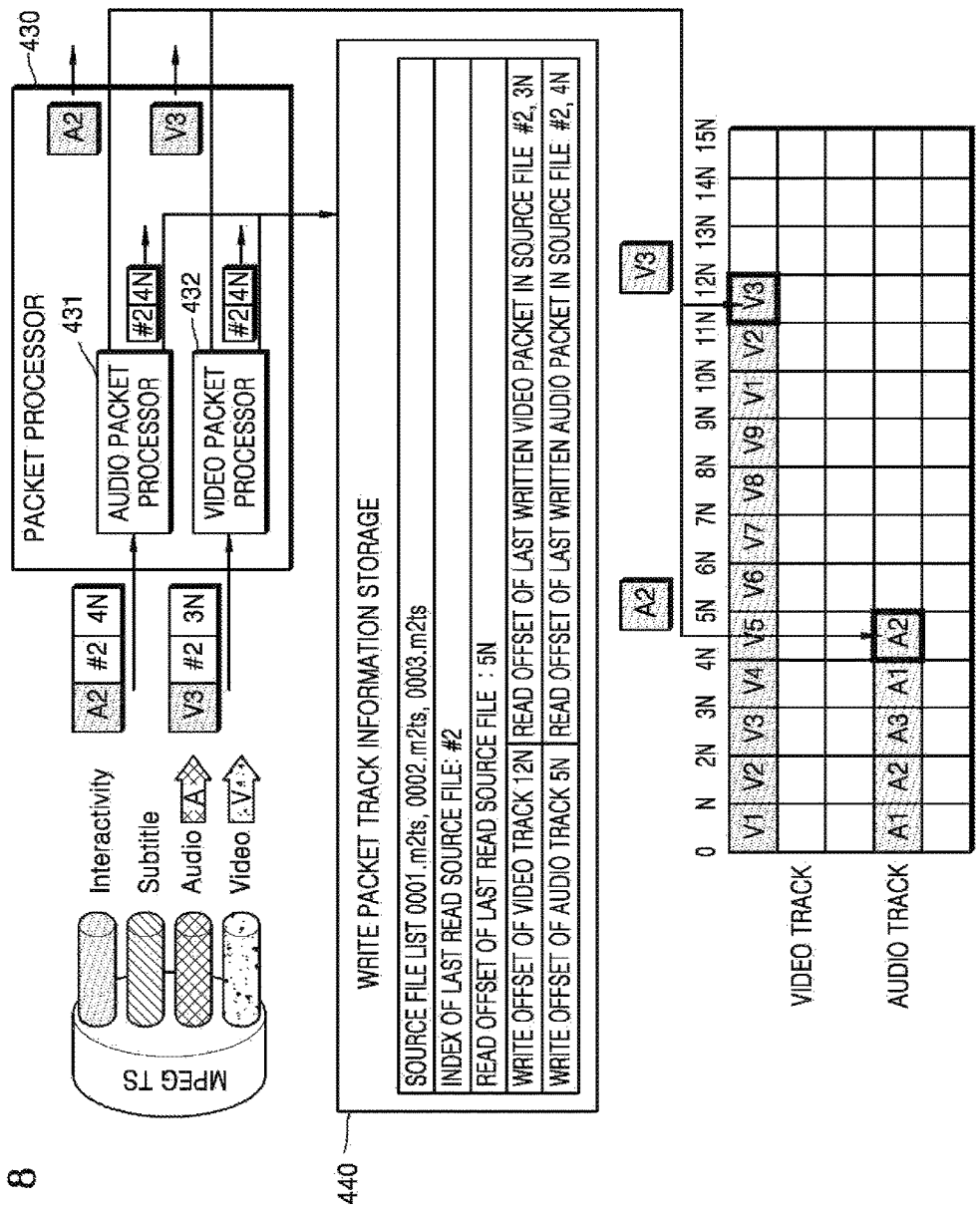
FIG. 8 is a block diagram illustrating an example operation of a packet processor illustrated in FIG. 4, according to an example embodiment.

FIG. 8 is a block diagram illustrating an example operation of the packet processor 430 illustrated in FIG. 4, according to an example embodiment.

Referring to FIG. 8, the packet processor 430 may receive the audio packet and the video packet, to which the location tags are added, from the demultiplexer 420. The audio packet processor 431 receives the audio packet including the location tag, and the video packet processor 432 receives the video packet including the location tag.

The audio packet processor 431 and the video packet processor 432 may store read/write track information in the read/write track information storage 440 to record a read location and a write location of packets to be processed, each time when processing a packet. By storing read/write track information each time processing of packets is performed as described above, when a data transferring operation has to be paused due to diverse factors and needs to be resumed later, read locations and write locations of source files may be reliably determined based on the stored read/write track information.

For example, the video packet processor 432 may receive the video packet V3 including the location tag (#2,3N). The video packet processor 432 may take off the location tag (#2,3N) from the video packet V3, and write the video packet V3, from which the location tag is taken off, at a write location 11N of the video track of the second medium 300. In addition, the video packet processor 432 stores the location tag (#2,3N) as a read offset in a source file of a last written video packet, in the read/write track information storage 440. However, the video packet processor 432 does not have to always store the same location tag as a read offset, and the read offset may be any value preceding that of a location included in the location tag. For example, in the case of the location tag (#2, 3N), the audio packet processor 432 may store (#2, 2N) as a read offset. Any read offset of a preceding value will not cause trouble in subsequent location tracking.

For example, the audio packet processor 431 may receive the audio packet A2 including the location tag (#2,4N). The audio packet processor 431 may take off the location tag (#2,3N) from the audio packet A2, and write the audio packet A2, from which the location tag is taken off, at a write location 4N of the audio track of the second medium 300. In addition, the audio packet processor 431 stores the location tag (#2,4N) as a read offset in a source file of a last written audio packet, in the read/write track information storage 440. However, the audio packet processor 431 does not have to always store the same location tag as a read offset, and the read offset may be any value preceding that of a location included in the location tag. For example, in the case of the location tag (#2, 4N), the audio packet processor 431 may store (#2, 3N) as a read offset. Any read offset of a preceding value will not cause trouble in subsequent location tracking.

In addition, the packet processor 430 may further store, as track information in the read/write track information storage 440, the source file list containing 0001.m2ts, 0002.m2ts, 0003.m2ts, an index #2 of the last read source file, a read offset 4N of the last read source file, a write offset 12N of the video track, and a write offset 5N of the audio track.

As described above, each time when processing a packet, the packet processor 430 may store information that may be used to track the packet, in the read/write track information storage 440.

According to an example embodiment, while the data transferring device 400 performs a data transferring operation as described above, the data transferring device 400 may receive a PAUSE command to pause the operation. Alternatively, the data transferring device 400 may have to pause the data transferring operation due to certain system errors. As described above, if data transferring is paused at a predetermined point, some pieces of data that are read from a source file and input to a demultiplexer may not be stored in an output file but have to be discarded. In addition, an amount of data to be discarded from a video stream and an audio stream cannot be predicted. Accordingly, the read/write track information storage 440 may store, for each packet being processed, a location of a source file from which the packet is read and a location of an output file to which the packet is written, thereby reliably tracking a location of each processed packet.

When a PAUSE command is received according to an example embodiment, the controller 450 may store the read/write track information stored in the read/write track information storage 440, in a nonvolatile memory. If the read/write track information storage 440 is a nonvolatile memory device, an additional operation may not be necessary.

According to an example embodiment, a nonvolatile memory to which the controller 450 may transfer the read/write track information stored in the read/write track information storage 440 may be included in the data transferring device 400 or may be a portion of the second medium 300.

According to an example embodiment, the controller 450 may store the read/write track information stored in the read/write track information storage 440, in an external HDD which is a type of the second medium 300. Even when the external HDD is separated from the data transferring device 400 due to various reasons, if the external HDD is reconnected to the data transferring device 400 later, the data transferring device 400 may read the read/write track information stored in the external HDD to resume data transferring from a point where it has been paused.

According to an example embodiment, when a RESUME command is received to resume a data transferring operation or when a system error is remedied so that the data transferring operation may be resumed, the controller 450 may load read/write track information stored in a nonvolatile memory to the read/write track information storage 440 and control the reader 410 to read data from the first medium 200 based on the loaded information.

Figure 9:
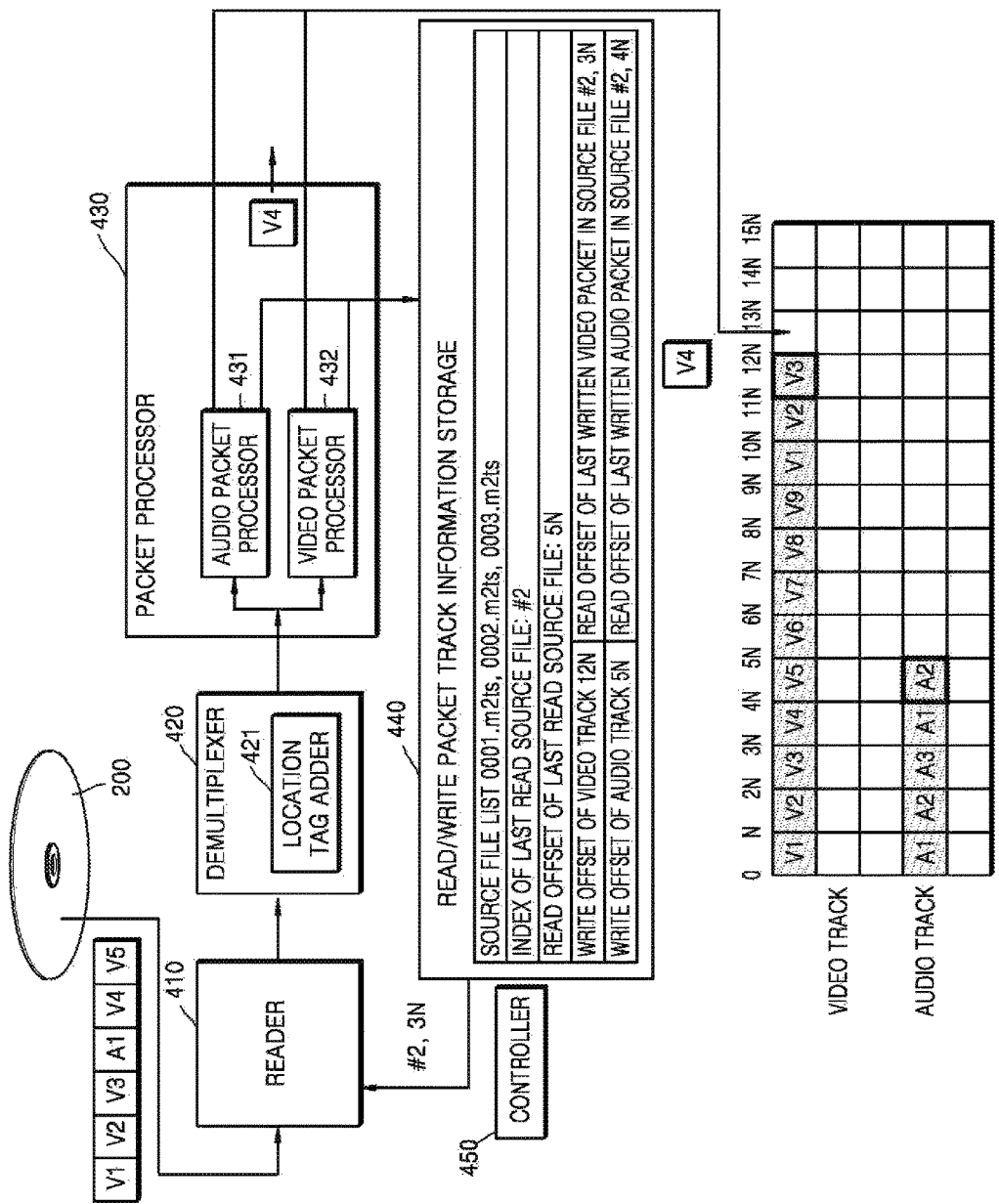
FIG. 9 is a block diagram illustrating an example operation of resuming a data transferring operation based on read/write track information, according to an example embodiment.

FIG. 9 is a block diagram illustrating an example operation of resuming a data transferring operation based on read/write track information, according to an example embodiment.

Referring to FIG. 9, when resuming a data transferring operation, the controller 450 may load read/write track information stored in a nonvolatile memory to the read/write track information storage 440, and may control the reader 410 to read data from the first medium 200 based on the loaded information.

The controller 450 may compare a read offset in a source file of a last written video packet and a read offset in a source file of a last written audio packet, included in the loaded read/write track information, and set a location corresponding to a smaller offset as a read location. For example, in the embodiment illustrated in FIG. 9, as the read offset (#2,3N) in the source file of the last written video packet is smaller than the read offset (#2,4N) in the source file of the last written audio packet, the controller 450 may control the reader 410 such that the reader 410 reads data from the read offset 3N in the source file 0002.m2ts having the index #2, from among the source files of the first medium 200.

The reader 410 may read data from the read offset 3N of the source file 0002.m2ts having the index #2 from among the source files of the first medium 200. If previously processed audio packets and video packets are received, the audio packet processor 431 and the video packet processor 432 may determine the previously processed packets by referring to the content of the read/write track information storage 440, and thus the previously processed audio packets and video packets may be ignored.

Figure 10:
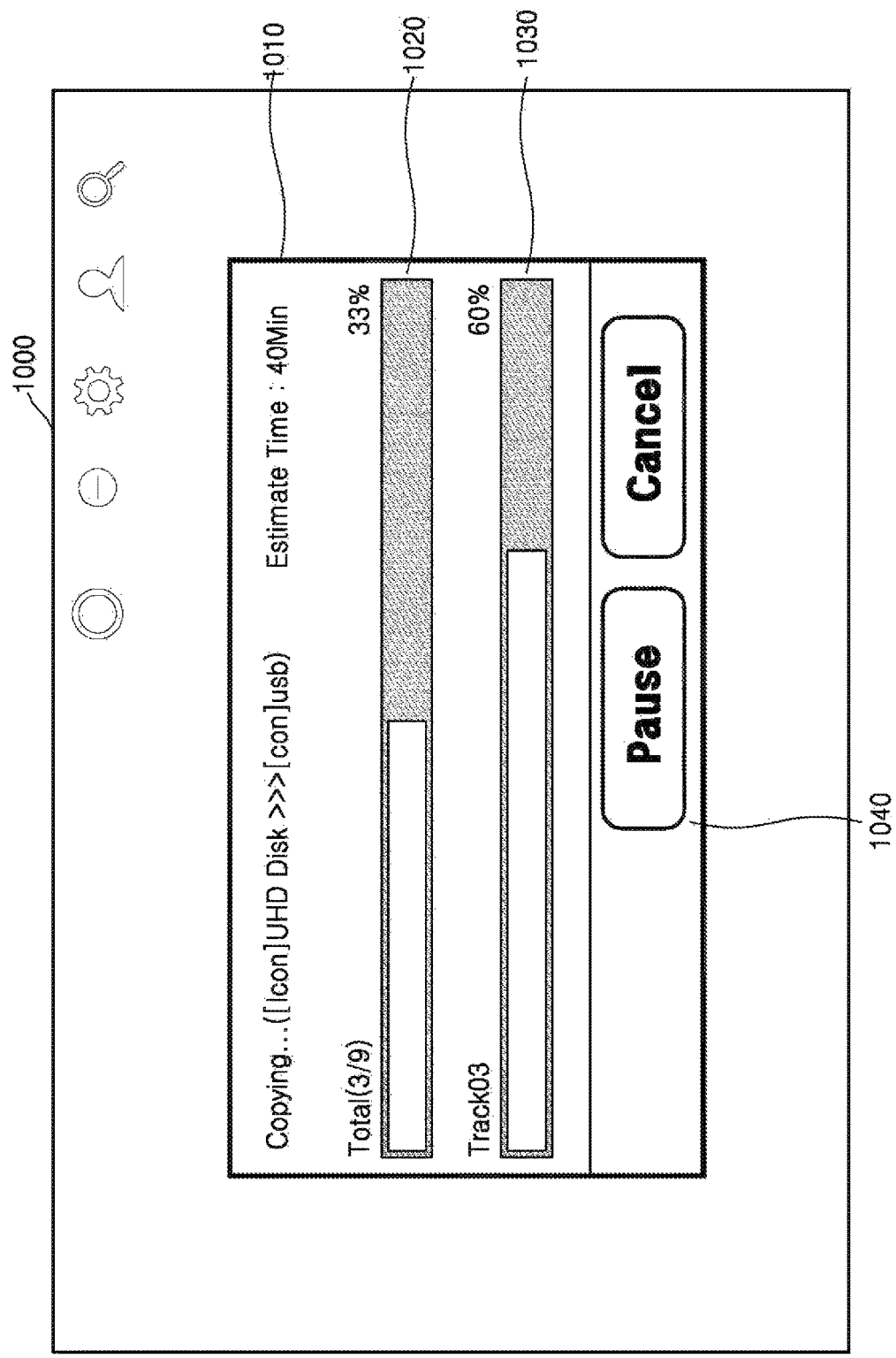
FIG. 10 is a diagram illustrating an example of a user interface through which a PAUSE command for pausing data transferring may be input, according to an example embodiment.

FIG. 10 is a diagram illustrating an example of a user interface through which a PAUSE command for pausing data transfer may be input, according to an example embodiment.

Referring to FIG. 10, a display device 1000 that is included in or connected to the data transferring device 400 may display a user interface 1010 through which a PAUSE command 1040 for pausing data transfer may be input. A progress bar 1020 displayed on the user interface 1010 may indicate that data transfer regarding three out of nine data tracks in total is in progress, and a progress bar 1030 may indicate a progress state of a third track.

As the user selects a PAUSE item 1040, the data transferring device 400 receives a PAUSE command and store read/write track information in a nonvolatile memory. Then when the user retrieves the user interface 1010 to resume data transfer, the user interface 1010 may display a RESUME item instead of the PAUSE item 1040. As the user selects the RESUME item, the data transferring device 400 may receive a RESUME command and load the read/write track information stored in the nonvolatile memory, to the read/write track information storage 440, so as to resume reading data.

According to the related art, a user is inconvenienced by having to pause an ongoing data transferring operation in order to watch a movie, and then after finishing watching the movie, the user has to restart the data transferring operation that the user has previously begun and stopped, from the start again. However, according to the example embodiment of the present inventive concept, an ongoing data transferring operation may be paused any time, for example, when a user wants to watch a movie. After finishing watching the movie, the previous data transferring operation may be resumed from a point where it was paused.

Figure 11:
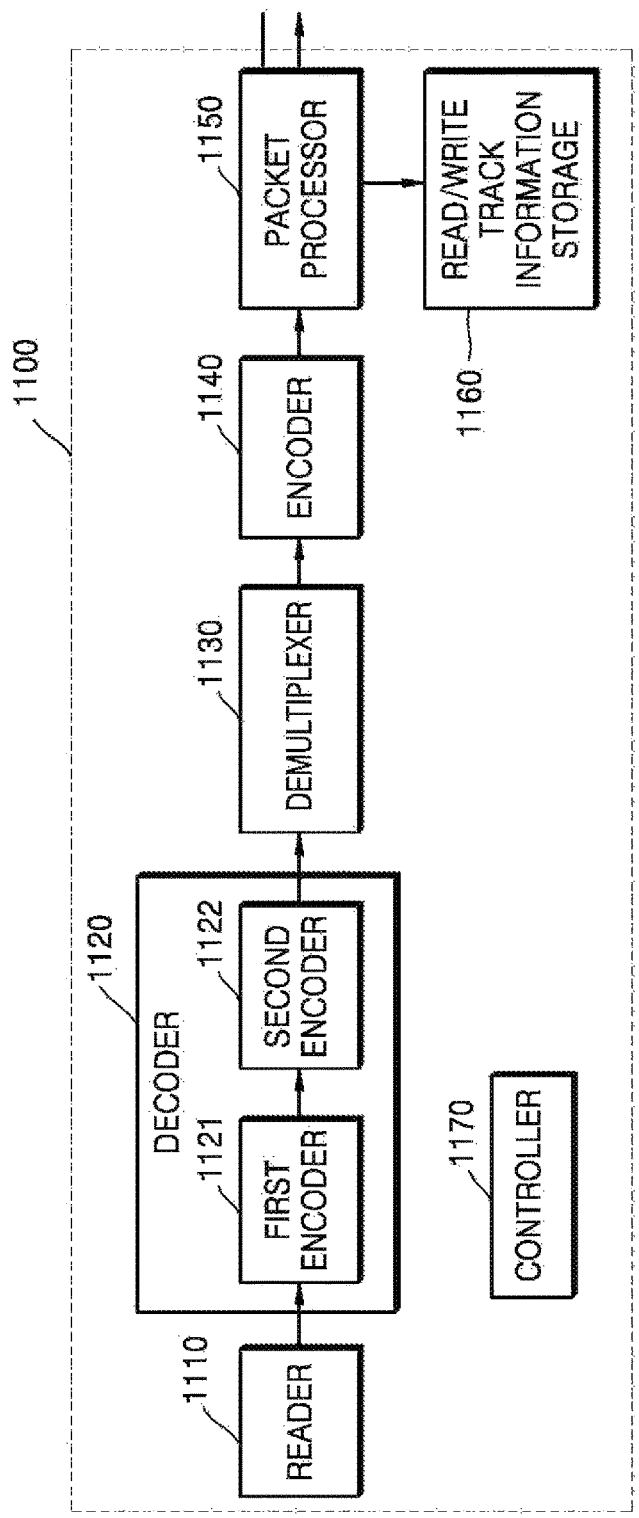
FIG. 11 is a block diagram illustrating another example of a data transferring device according to an example embodiment.

FIG. 11 is a diagram illustrating another example of a data transferring device 1100 according to an example embodiment.

Referring to FIG. 11, the data transferring device 1100 may include a reader 1110, a decoder 1120, a demultiplexer 1130, an encoder 1140, a packet processor 1150, a read/write track information storage 1160, and a controller 1170.

The reader 1110, the decoder 1120, the packet processor 1150, the read/write track information storage 1160, and the controller 1170 are respectively the same as the respectively corresponding elements described above with reference to FIG. 1 or FIG. 4, and thus repeated descriptions thereof will be omitted here.

Audio-visual data stored in the first medium 200 may be encoded using at least one encoding method or at least one DRM. The encoded audio-visual data may be decoded using a corresponding decoding method before performing demuliplexing.

The decoder 1120 may include a first decoder 1121 and a second decoder 1122.

For example, if a first medium is a Blu-ray disc, audio-visual data stored in the first medium is encoded using an Advanced Access Content System (AACS) and BDPlus (BD+), and thus the first decoder 1121 may perform decoding by using a reverse AACS, and the second decoder 1122 may perform decoding by using a reverse BDPlus.

In addition, in order to store the audio-visual data in a second medium, the audio-visual data may be encoded in a format of the second medium.

The encoder 1140 may encode demultiplexed audio-visual data by using a method designated by the format of the second medium. For example, the encoder 1140 may encode the audio-visual data according to Advanced Encryption Standard (AES) 128.

Figure 12:
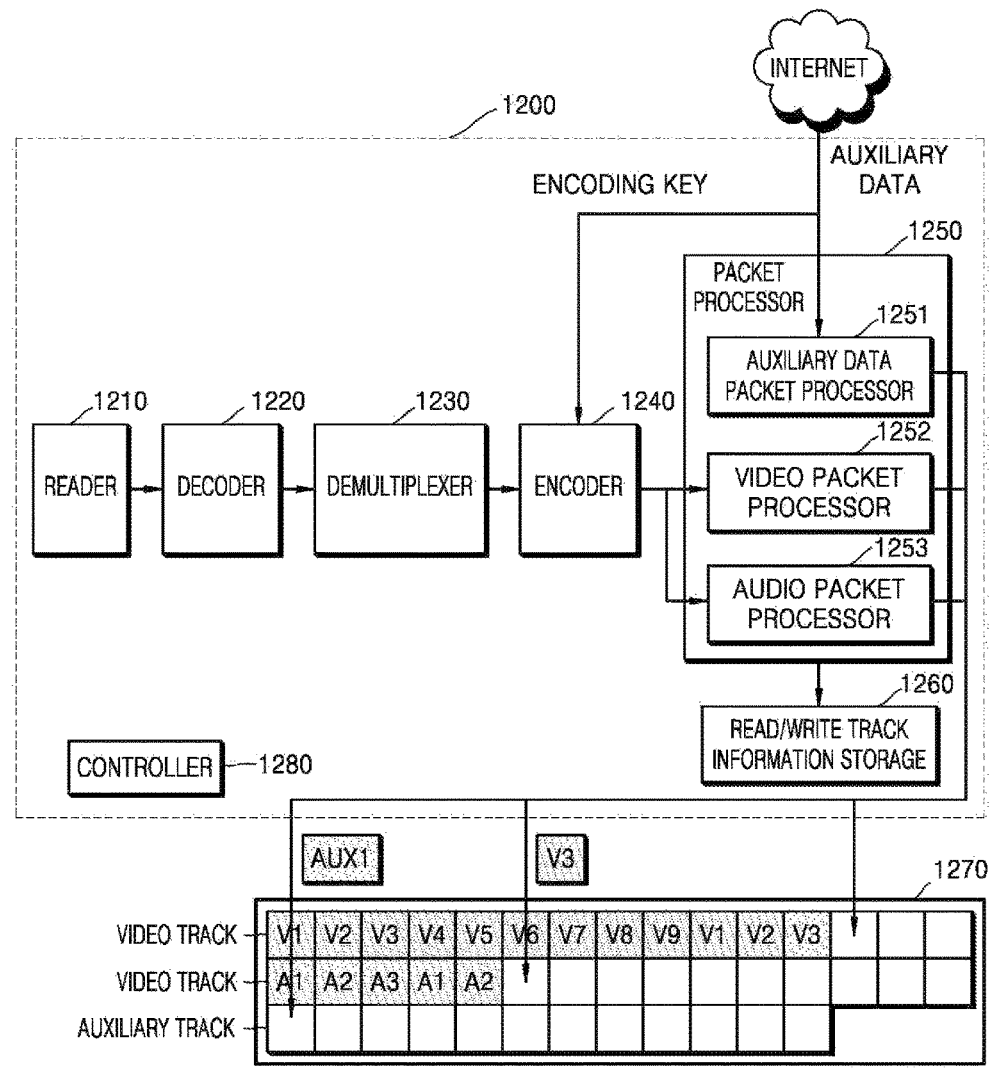
FIG. 12 is a block diagram illustrating another example of a data transferring device according to an example embodiment.

FIG. 12 is a diagram illustrating another example of a data transferring device 1200 according to an example embodiment.

Referring to FIG. 12, the data transferring device 1200 may include a reader 1210, a decoder 1220, a demultiplexer 1230, an encoder 1240, a packet processor 1250, a read/write track information storage 1260, and a controller 1280.

Elements of the data transferring device 1200 having the same functions as those of respectively corresponding elements described with reference to FIGS. 1, 4, and 10 will not be repeatedly described here.

The encoder 1240 may encode an audio packet or a video packet by using an encoding key downloaded through the Internet.

The packet processor 1250 may further include an auxiliary data packet processor 1251 in addition to a video packet processor 1252 and an audio packet processor 1253. The packet processor 1250 may not use subtitles or interactive data stored in the first medium 200 but store auxiliary data such as subtitles or interactive data downloaded via the internet, in the second medium 1270. The second medium 1270 further include an auxiliary data track in addition to a video track and an audio track, and the auxiliary data packet processor 1251 may write processed auxiliary data packets to the auxiliary data track.

Figure 13:
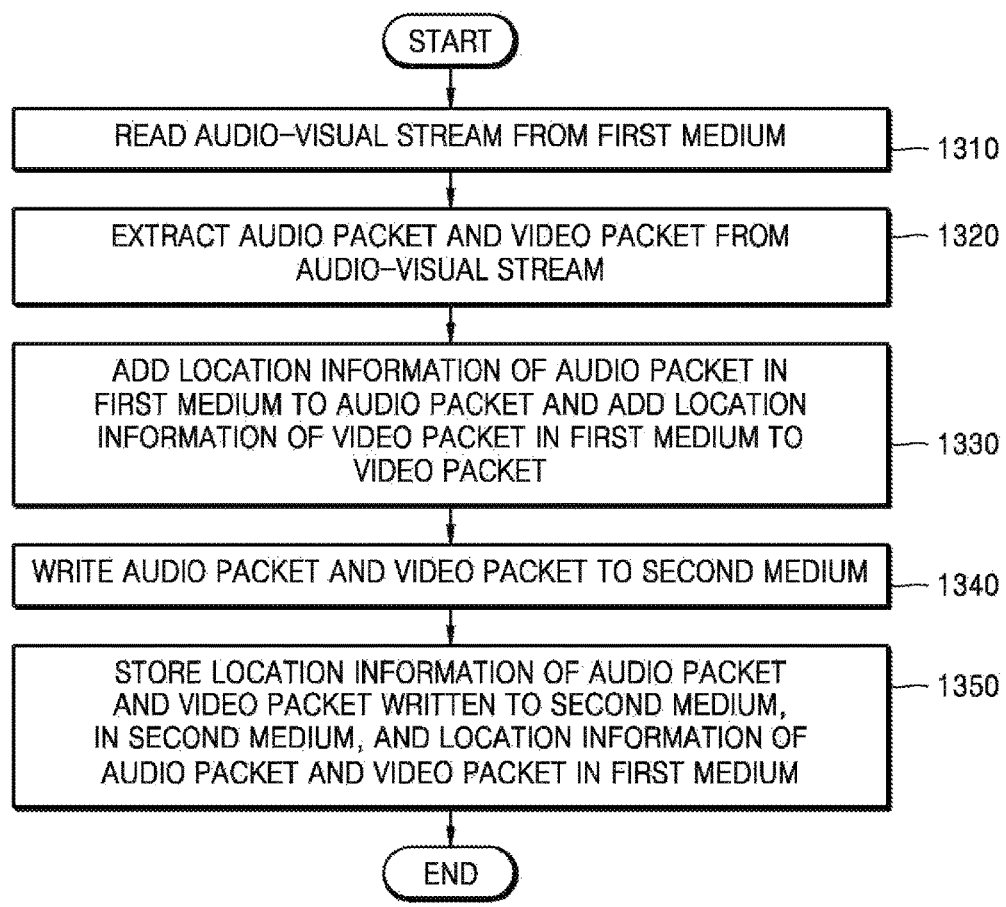
FIG. 13 is a flowchart illustrating an example of a data transferring method according to an example embodiment.

FIG. 13 is a flowchart illustrating an example of a data transferring method according to an example embodiment.

Referring to FIG. 13, in operation 1310, the reader 410 of the data transferring device 400 reads an audio-visual stream from a first medium.

In operation 1320, the demultiplexer 420 extracts an audio packet and a video packet from the audio-visual stream read using the reader 410.

If the audio-visual data is encoded in a format of the first medium, the audio-visual data may be decoded based on the format of the first medium before demultiplexing.

In operation 1330, the demultiplexer 420 may add location information of the audio packet in the first medium, to the audio packet, and add location information of the video packet in the first medium, to the video packet.

According to an example embodiment, the location information of the video packet in the first medium may include an index of a source file including the video packet and a location of the video packet in the source file including the video packet. By adding location information of a packet to be processed, in the first medium, as described above, a location in the first medium, of the video packet to be written to the second medium may be tracked. The audio packet is processed in the same manner.

In operation 1340, the packet processor 430 may write the audio packet and the video packet to the second medium. The packet processor 430 may write the video packet and the audio packet, from which location tags added thereto are taken off, to the second medium.

In operation 1350, the packet processor 430 may store location information of the audio packet and the video packet written to the second medium, in the second medium, and location information of the audio packet and the video packet in the first medium, in the read/write track information storage 440.

According to an example embodiment, the location information of the audio packet and the video packet written to the second medium, in the second medium, may include a location of the audio packet written to the audio track of the second medium and a location of the video packet written to the video track of the second medium.

According to an example embodiment, the location information of the audio packet and the video packet in the first medium may include an index of a source file including the video packet written to the second medium and a location of the video packet in the source file including the video packet and an index of a source file including the audio packet written to the second medium and a location of the audio packet in the source file including the audio packet.

Figure 14:
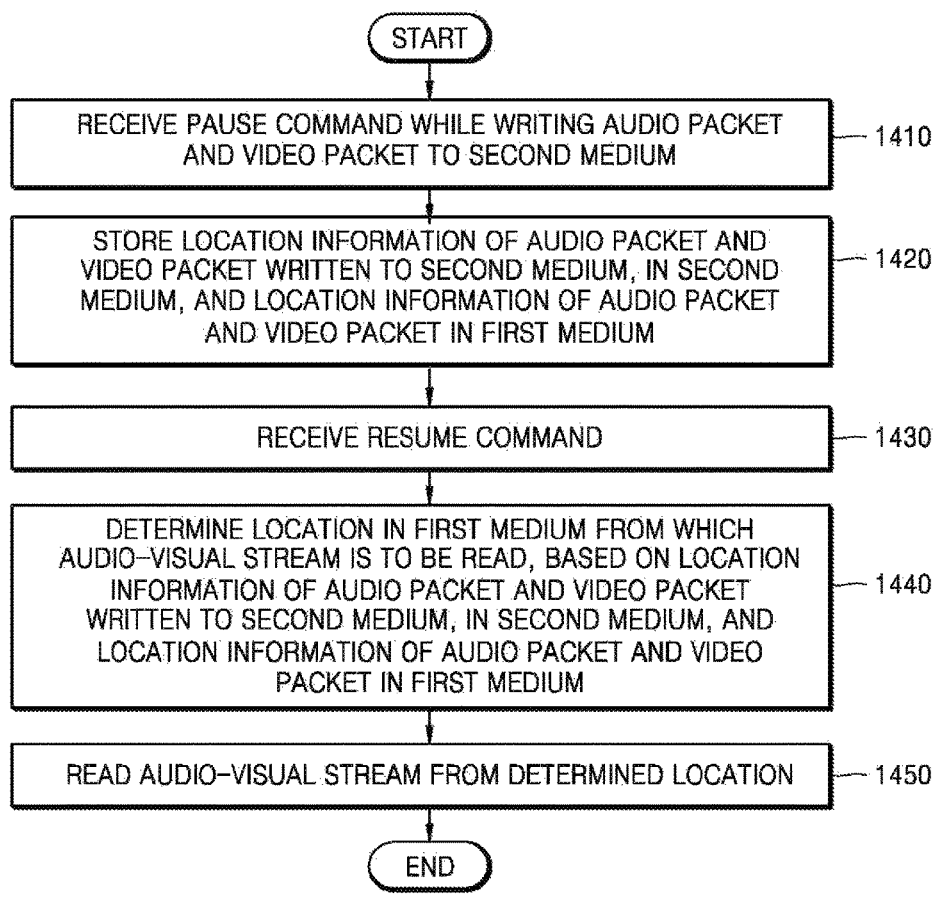
FIG. 14 is a flowchart illustrating another example of a data transferring method according to an example embodiment.

FIG. 14 is a flowchart illustrating another example of a data transferring method according to an example embodiment.

Referring to FIG. 14, in operation 1410, the controller 450 of the data transferring device 400 receives a PAUSE command during an operation of writing an audio packet and a video packet to a second medium.

In operation 1420, the controller 450 may store location information of the audio packet and the video packet written to the second medium, in the second medium, and location information of the audio packet and the video packet in the first medium.

Next, in operation 1430, the controller 450 receives a RESUME command to resume data transfer.

In operation 1440, the controller 450 may determine a location in the first medium from which an audio-visual stream is to be read, based on the location information of the audio packet and the video packet written to the second medium, in the second medium, and the location information of the audio packet and the video packet in the first medium, which are stored in the nonvolatile memory.

In operation 1450, the reader 410 reads the audio-visual stream from the location determined by the controller 450.

According to the example embodiments, when transferring data from a first medium to a second medium, a location of each data packet being transferred may be tracked so that even when a data transferring operation is paused due to various factors, the data transferring operation may be resumed later from a point where the operation was paused, by using track information regarding the location of the data packet.

While data including both an audio packet and a video packet is described in the above example embodiments, the example embodiments may also be applied to just an audio packet or just a video packet.

The example embodiments may be implemented as program instructions that can be executed using various computer components and can be written to a computer readable recording medium. The computer readable recording medium may include program instructions, a data file, a data structure etc. alone or in combination. The program instructions written to the computer readable recording medium may be specifically designed and configured for the embodiments of the present inventive concept or may be well-known and available to one of ordinary skill in the art. Examples of the computer readable recording medium include magnetic storage media (e.g., hard disks, floppy disks, magnetic tapes, etc.), optical recording media (e.g., CD-ROMs, or DVDs), magneto-optical media (e.g., floptical disks), and hardware devices specifically configured to store and execute program instructions (e.g., ROM, RAM, flash memories, etc.). Examples of the program instructions include not only machine codes generated by using a compiler but also high-level language codes that can be executed on a computer by using an interpreter or the like.

While the present disclosure and advantages thereof have been described with reference to the example embodiments, it will be understood by those of ordinary skill in the art that various changes in form and details may be made therein without departing from the spirit and scope as defined by the following claims. Therefore, it should be understood that the example embodiments described herein should be considered in a descriptive sense only and not for purposes of limitation. All such possible modifications are intended to fall within the scope of the present disclosure.

What is claimed is:

1. A device configured to transfer an audio-visual stream stored in a first medium to a second medium, the device comprising:
    a memory;
    a reader comprising reading circuitry; and
    a controller configured to:
        control the reader to read the audio-visual stream from the first medium;
        extract an audio packet and a video packet from the audio-visual stream;
        identify locations at which the audio packet and the video packet are read from the first medium;
        write the audio packet and video packet to the second medium;
        in response to receiving a pause command to pause transferring, store, in the memory, first location information indicating locations at which the audio packet and the video packet are written in the second medium, and second location information indicating the locations at which the audio packet and the video packet are read from the first medium; and
        in response to receiving a resume command to resume transferring, identify, from the memory, the second location information indicating locations at which the audio packet and the video packet are read from the first medium, and control the reader to read the audio-visual stream from the locations corresponding to the identified second location information from the first medium.

2. The device of claim 1, wherein the controller comprises:
    a demultiplexer configured to:
        extract the audio packet and the video packet from the audio-visual stream;
        add information on a location at which the audio packet is read from the first medium, to the audio packet; and
        add information on a location at which the video packet is read from the first medium, to the video packet, and
    a packet processor configured to:
        receive the audio packet and the location information added to the audio packet, and the video packet and the location information added to the video packet; and
        write the audio packet and video packet to the second medium; and
        store, in the memory, the first location information and the second location.

3. The device of claim 1, wherein the first location information comprises a location of a video packet last written to a video track of the second medium and a location of an audio packet last written to an audio track of the second medium.

4. The device of claim 1, wherein the second location information comprises:
    an index of a source file in the first medium including a video packet last written to the second medium and a location of the video packet in the source file; and
    an index of a source file in the first medium including an audio packet last written to the second medium and a location of the audio packet in the source file.

5. The device of claim 2, wherein the packet processor is further configured to store a list of source files stored in the first medium, an index of a source file last read from among the source files, and a last read location in the last read source file.

6. The device of claim 1, wherein the controller is further configured to:
    receive a command to pause transferring of data from the first medium to the second medium, and
    store in a nonvolatile memory, in response to the pause command, the first location information and the second location information.

7. The device of claim 6, wherein the controller is further configured to:
    receive a command to resume transferring of data from the first medium to the second medium; and
    in response to the received resume command, resume data transfer based on the first location information and the second location information, stored in the nonvolatile memory.

8. The device of claim 7, wherein the controller is further configured to:
    determine an index of the source file of the first medium from which the audio-visual stream is to be read; and
    determine a read location in the source file, based on the second location information.

9. The device of claim 1, further comprising at least one of:
    a decoder configured to decode the audio-visual stream read from the first medium, based on a format of the first medium; and
    an encoder configured to encode the acquired video packet and audio packet based on a format of the second medium.

10. The device of claim 1, wherein the first medium comprises a Blu-ray disc, and the second medium comprises a nonvolatile memory.

11. A method of operating a device for transferring an audio-visual stream stored in a first medium to a second medium, the method comprising:
reading the audio-visual stream from the first medium;
extracting an audio packet and a video packet from the audio-visual stream;
identifying locations at which the audio packet and the video packet are read from the first medium;
writing the audio packet and video packet to the second medium;
in response to receiving a pause command to pause transferring, storing, in a memory of the device, first location information indicating locations at which the audio packet and the video packet are written in the second medium and second location information indicating the locations at which the audio packet and the video packet are read from the first medium; and
in response to receiving a resume command to resume transferring, identifying, from the memory, the second location information indicating locations at which the audio packet and the video packet are read from the first medium, and reading the audio-visual stream from the locations corresponding to the identified second location information from the first medium.

12. The method of claim 11, further comprising: by a demultiplexer,
extracting the audio packet and the video packet from the audio-visual stream;
adding information on a location at which the audio packet is read from the first medium, to the audio packet; and
adding information on a location at which the video packet is read from the first medium, to the video packet, and
by a packet processor,
receiving the audio packet and the location information added to the audio packet, and the video packet and the location information added to the video packet; and
writing the audio packet and video packet to the second medium; and
storing, in the memory, the first location information and the second location.

13. The method of claim 11, wherein the first location information comprises a location of a video packet last written to a video track of the second medium and a location of an audio packet last written to an audio track of the second medium.

14. The method of claim 11, wherein the second location information comprises:
an index of a source file in the first medium including a video packet last written to the second medium and a location of the video packet in the source file; and
an index of a source file in the first medium including an audio packet last written to the second medium and a location of the audio packet in the source file.

15. The method of claim 11, further comprising storing a list of source files stored in the first medium, an index of a source file last read from among the source files, and a last read location in the last read source file.

16. The method of claim 11, further comprising:
receiving a command to pause transferring of data from the first medium to the second medium; and
storing in a nonvolatile memory, in response to the pause command, the first location information and the second location information.

17. The method of claim 16, further comprising:
receiving a command to resume transferring of data from the first medium to the second medium; and
in response to the received resume command, resuming data transfer based on the first location information and the second location information, stored in the nonvolatile memory.

18. The method of claim 17, wherein the resuming of the transfer of data comprises determining an index of the source file of the first medium from which the audio-visual stream is to be read and a read location in the source file, based on the second location information.

19. The method of claim 11, further comprising at least one of:
decoding the audio-visual stream read from the first medium, based on a format of the first medium; and
encoding the acquired video packet and audio packet based on a format of the second medium.

20. The method of claim 11, wherein the first medium comprises a Blu-ray disc, and the second medium comprises a nonvolatile memory.

* * * * *